O. C. SCHULZ.
MACHINE FOR MAKING SURGICAL BANDAGES.
APPLICATION FILED MAY 5, 1909.
1,026,283.
Patented May 14, 1912.
2 SHEETS—SHEET 1.
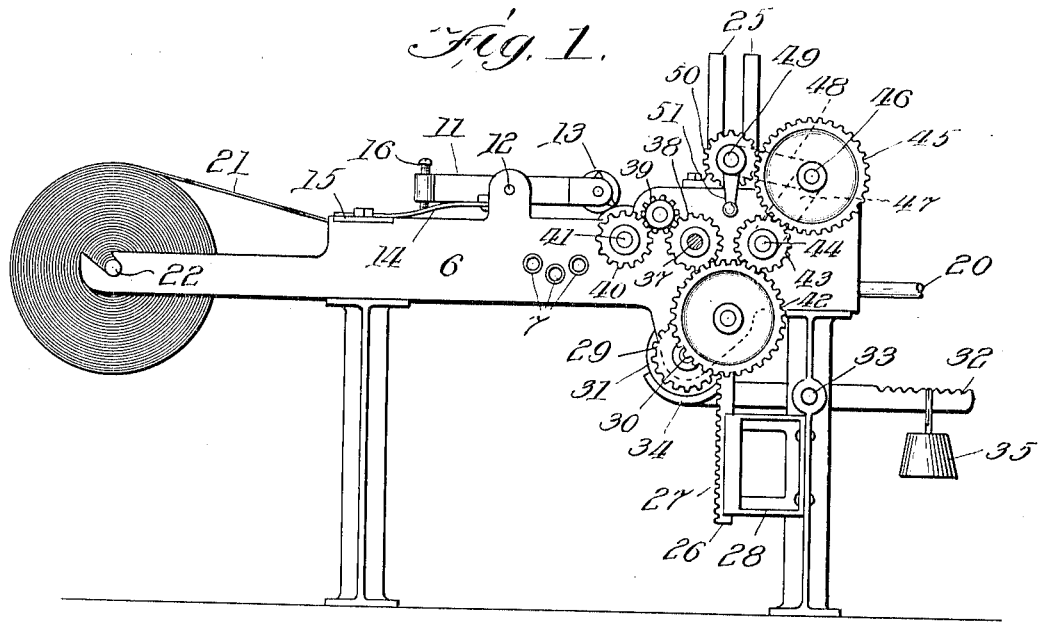
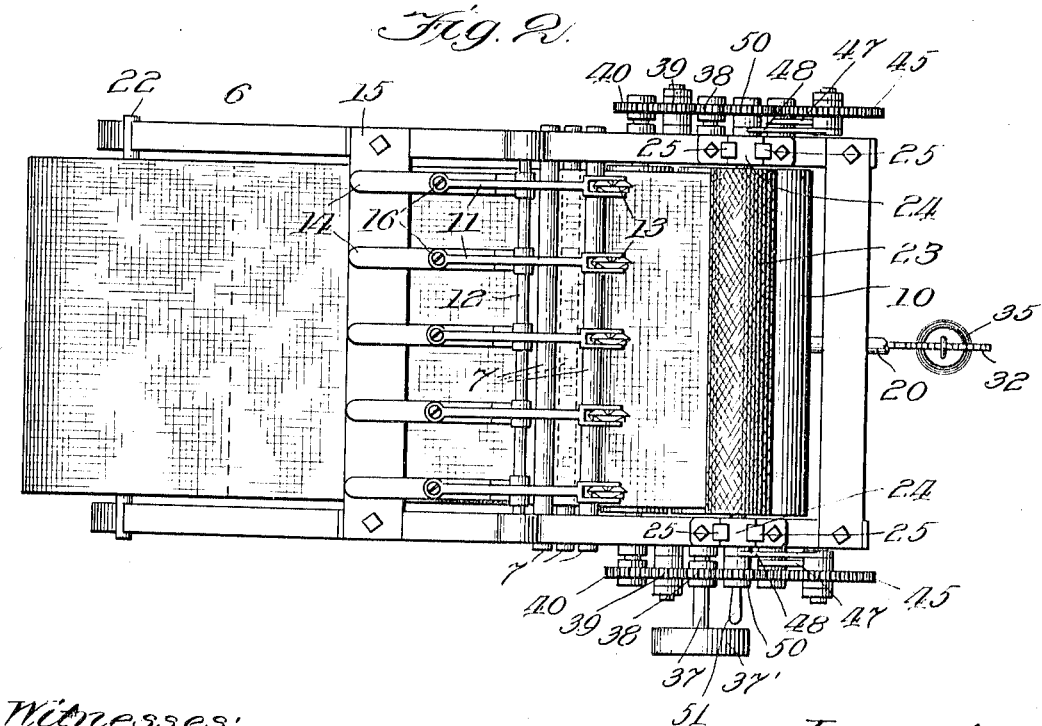
Witnesses:
Harry L. Gaither
M. A. Kiddie
Inventor:
Otto C. Schulz
by Wm. T. Belt
Atty

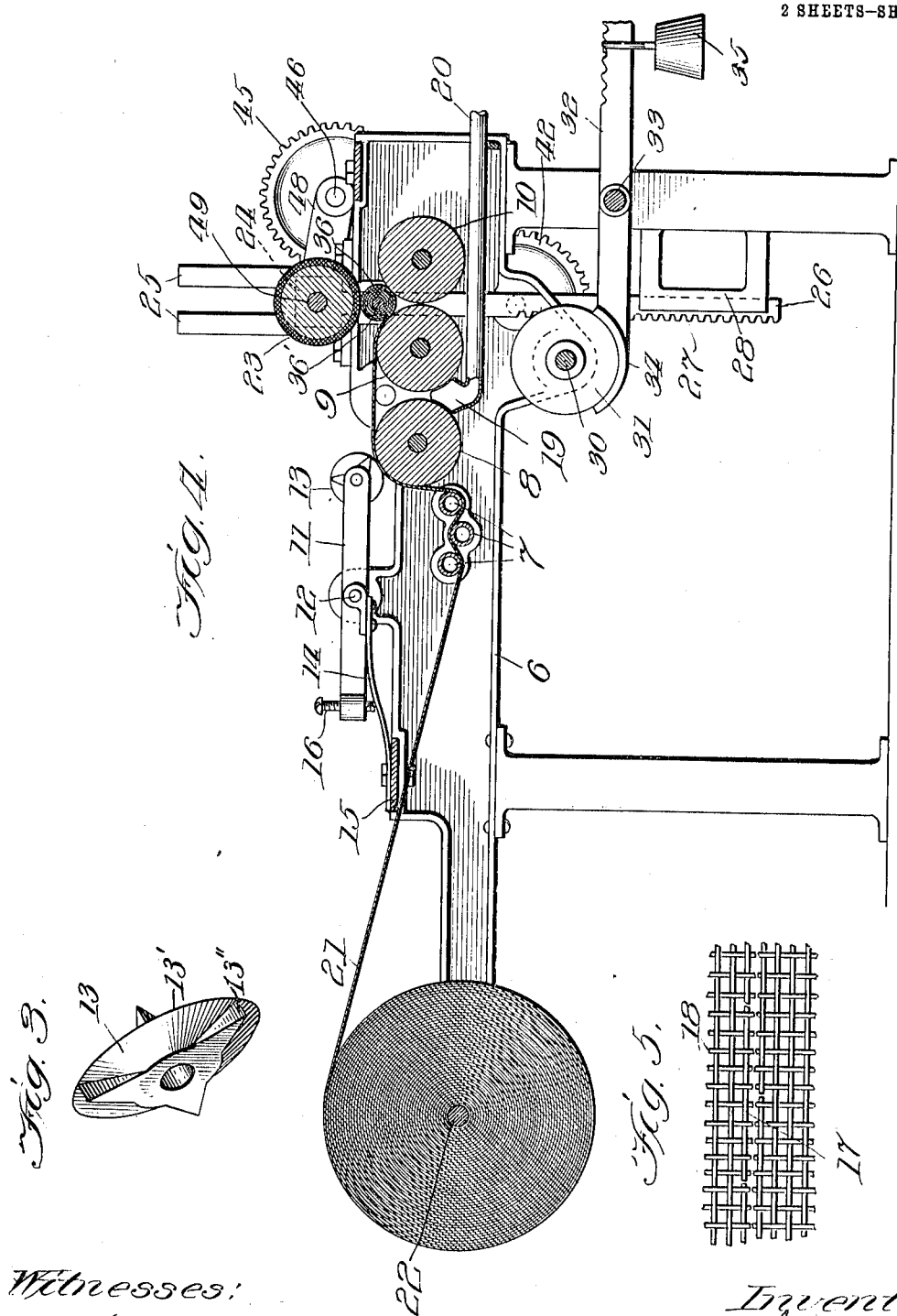

UNITED STATES PATENT OFFICE.

OTTO C. SCHULZ, OF CHICAGO, ILLINOIS, ASSIGNOR TO BAUER & BLACK, OF CHICAGO, ILLINOIS, A CORPORATION OF ILLINOIS.

MACHINE FOR MAKING SURGICAL BANDAGES.

1,026,283.  Specification of Letters Patent.  Patented May 14, 1912.

Application filed May 5, 1909. Serial No. 494,019.

*To all whom it may concern:*

Be it known that I, OTTO C. SCHULZ, a citizen of the United States, residing at Chicago, in the county of Cook and State of Illinois, have invented new and useful Improvements in Machines for Making Surgical Bandages, of which the following is a specification.

The object of this invention is to provide a machine of simple construction and which can be easily and rapidly operated for making surgical bandages in rolls of any desired size from a roll or bolt of gauze. And another important object of the invention is to remove loose or raveled warp threads from the edges of the bandages while they are being made so that the bandage roll will have its ends completely finished and entirely free from ravelings when it is removed from the machine. And further objects of the invention are to cut the material lengthwise in parallel lines to separate it into bandages and at the same time to cut the material transversely from each lengthwise cut and at suitably spaced intervals to divide the warped threads at the edges of each bandage, which may be loose or raveled, into short lengths and then remove them from the bandages; to adjust the cutters to the work and for bandages of different width; to provide means for winding the bandage tightly in a roll, and to facilitate the removal of the bandage from the machine.

In the accompanying drawings illustrating the invention Figure 1 is a side elevation. Fig. 2 is a top plan view. Fig. 3 is a detail view of one of the rotary cutters. Fig. 4 is a longitudinal sectional view. Fig. 5 is a detail enlarged view of the material showing how it is cut.

Referring to the drawings, 6 designates a frame of any suitable construction in which are supported a plurality of tension rollers 7, a steel platen roller 8, and two feed rollers 9, 10. The platen roller and two feed rollers are arranged in alinement with each other and the tension rollers are located in any suitable position in front of the platen roller.

A plurality of cutter bars 11 are movably mounted on a cross rod 12 supported in the frame and each of these cutter bars carries a rotary cutter 13 at its forward end which operates against the platen roller. The cutter is held to the work by a flat spring 14 which is fastened to the cutter bar in front of the rod 12 and bears upon a cross plate 15 on the frame of the machine. An adjusting screw 16 operating in the cutter bar and engaging the flat spring adjusts the tension of the spring.

Each rotary cutter has a peripheral cutting edge 13′ and a plurality of transverse cutting edges 13″ spaced apart along the peripheral cutting edge and on alternate sides thereof. The peripheral cutting edge being circular in form makes a continuous cut lengthwise of the material as it passes over the platen and the transverse cutting edges sever one or more warp threads at the edges of each bandage. When a material such as gauze, of which these bandages are made, is cut lengthwise the warp threads adjacent to the cut edges become loose and ravel more or less and various methods of removing these ravelings have been followed. The transverse cutting edges, in effect, notch the edges of the bandage as it is cut from the strip of material and divide one or more of the outer warp threads on the bandage into very short lengths 17 (Fig. 5), so that they can be easily removed. In material like gauze these warp threads will not run in straight parallel lines but, on the contrary, they generally run irregularly and may be cut several times by a single peripheral cutting edge. If the bandage is not notched in the edges in making, as herein described, a warp thread exposed at one place and worked loose might run so deeply into the bandage that it could not be pulled loose but must be broken. The disadvantage is entirely overcome by my invention which regularly notches the edge of the bandage so that the loose warp threads can be readily removed as hereafter described. The peripheral cutting edge cuts the weft threads 18 and any warp threads that may cross its path; the transverse cutting edges cut the warp threads and may possibly cut the ends of some of the weft threads. I say that the threads are cut in the sense that they are severed but as a matter of fact the edges are not necessarily knife edges and as the platen roller is made of steel it will be readily understood that the edges are somewhat dull and cut by crushing.

To remove the loose and divided warp threads from the bandage before it is rolled I provide a suction or blower head 19 which is preferably located between the platen roller 8 and the feed roller 9 and is connected by a pipe 20 with a suction fan or blower of any suitable character. Thus the loose threads at the edges of the bandage are removed before the bandage is rolled and thereby the bandage roll when completed will have its ends free from ravelings and in a smooth and attractive condition.

The material 21 in the form of a bolt or roll is mounted on a spindle 22 and supported in a suitable manner on the frame of the machine. The strip of material passes under the cutter bars, through the tension rollers, and over the platen roller 8 and feed roller 9 to a spindle 36' which is engaged with the end of the strip and dropped into place between the two feed rollers 9 and 10. A presser roller 23 is arranged to hold the spindle and the bandage roll as it is wrapped thereon in close contact with the feed rollers 9 and 10, thereby producing a tightly wound bandage roll. The presser roller is vertically adjusted and is mounted in suitable bearings 24 which slide vertically between guides 25 mounted on the frame of the machine. Bars 26 provided with toothed racks 27 are made fast in any suitable manner to the bearings 24 and are arranged to slide therewith, being guided in brackets 28 on the frame of the machine. These rack bars mesh with gears 29 which are carried by a shaft 30 supported in bearings on the frame and this shaft carries a brake roller 31. A lever 32 is pivotally mounted at 33 on the frame and is provided at one end with a shoe 34 to engage the brake roller and carries a weight 35 at its other end. The shoe operates constantly in engagement with the brake roller, and tends to retard the rotary movement thereof. The presser roller 23 is pushed upward by the bandage roll 36 as it is wound and the rack bars which are raised by the presser roller operate through the gears 29 to turn the brake roller. Hence the brake will tend to hold the presser roller tightly against the bandage roll as the latter is wound, and the bandage roll is tightly held thereby between the presser roll and the two feed rollers 9 and 10 so that it will be wound tightly. As the bandage roll grows larger the resistance to the upward movement of the presser roller which is afforded by the brake device will be increased and this insures that the bandage roll will be wound tightly.

The shaft 37 for the feed roller 9 is preferably the power shaft and it may carry a belt pulley 37' (Fig. 2). Gears 38 on shaft 37 mesh with idler gears 39 which in turn drive gears 40 on the shaft 41 of the roller platen 8. Gears 42 mesh with the gears 38 and drive gears 43 on the shaft 44 of the feed roller 10. The gears 43 mesh with gears 45 which are supported on stud shafts 46 mounted in the links 47 which are pivotally engaged with the shaft 44 and links 48 which are pivotally engaged with the shaft 49 of presser roller 23. The gears 45 mesh with gears 50 on the presser roller shaft 49. A handle 51 is provided on one end of the presser roller shaft so that said shaft can be turned by hand to lift the presser roller above the bandage roll to facilitate the removal of the bandage roll from the machine.

When a plurality of cutters are used the material will be divided into a number of bandage rolls but they will all be carried by the spindle 36'. The two end cutters are employed to cut off the selvage edges of the material. The cutters can be adjusted to cut the material into bandages of any desired width.

What I claim and desire to secure by Letters Patent is:

1. In a machine for making surgical bandages, the combination of a platen roller, feed rollers for feeding the material over the platen roller, a plurality of cutters operating against the platen for dividing the material into bandages, a spindle arranged between the feed rollers to receive the material after it is cut, and a vertically movable presser roller engaging the material on the spindle and holding it in contact with the feed rollers.

2. In a machine for making surgical bandages, the combination of a platen roller, a plurality of circular cutters operating against the platen for dividing the material into bandages, a pair of rollers for feeding the material over the platen, a spindle to receive the cut material and located between the feed rollers, a vertically movable presser roller to engage the material as it is wound on the spindle and press it against the feed rollers, and brake device for retarding the upward movement of the presser roller.

3. In a machine for making surgical bandages, the combination of a platen roller, a plurality of circular cutters operating against the platen for dividing the material into bandages, a pair of rollers for feeding the material over the platen, a spindle to receive the cut material and located between the feed rollers, a vertically movable presser roller to engage the material as it is wound on the spindle and press it against the feed rollers, a pair of rack bars movable vertically with the presser roller, a shaft, a brake roller on said shaft, gears on said shaft meshing with said rack bars, a brake shoe engaging the brake roller, and a weighted lever carrying said shoe.

4. In a machine for making surgical bandages, the combination of a platen roller, independent cutters each having a straight peripheral cutting edge and oppositely disposed cutting edges extending axially of the cutters, said cutters being adapted to coöperate with said platen roller to divide the material passing over said platen roller into a plurality of bandages, a spindle adapted to receive said bandages, and means for rotating the spindle whereby all of the bandages are wound in coaxially disposed rolls on said spindle.

5. In a machine for making surgical bandages the combination of a platen roller, means for feeding the material to be operated upon over said roller, a plurality of independent cutters coöperating with said platen roller to divide the material into a plurality of bandages, a spindle upon which said bandages are wound, and means for rotating said spindle to wind up the bandages thereon in coaxially disposed rolls.

6. In a machine for making surgical bandages, the combination of a platen roller, means for feeding the material to be operated upon over said roller, means coöperating with said platen roller to divide the material into a plurality of bandages and provide transversely disposed slits in the edges thereof, a rotatable spindle adapted to receive said bandages, and means for rotating the spindle whereby all of the bandages are wound in coaxially disposed rolls on said spindle.

7. In a machine for making surgical bandages, the combination of a platen roller, means for feeding the material to be operated upon over said roller, means coöperating with said platen roller to divide the material into a plurality of bandages, a spindle upon which the bandages are adapted to be wound, and means for rotating said spindle whereby said bandages are wound into coaxially disposed rolls on said spindle.

8. In a machine for making surgical bandages, the combination of a platen roller, means for feeding the material to be operated upon over said roller, means coöperating with said platen for dividing the material into strips and slitting the edges of said strips, a spindle upon which the bandages are adapted to be wound in coaxially disposed rolls, and means disposed between said platen roller and the spindle for removing the short threads at the edges of the strips produced by slitting the edges of the strips.

9. In a machine for making surgical bandages, the combination of a platen roller, means for feeding the material to be operated upon over said roller, a plurality of independently mounted cutters each having a peripheral cutting edge and transversely disposed cutting edges adapted to coöperate with said platen roller to divide the material into strips and slit the edges of said strips, a spindle upon which the cut bandages are wound in coaxially disposed rolls, and pneumatic means arranged between said platen roller and the spindle for removing the short lengths of thread produced at the edges of the bandages by the transversely disposed cutting edges of the cutters.

OTTO C. SCHULZ.

Witnesses:
WM. O. BELT,
M. A. KIDDIE.